(12) United States Patent
Kondo et al.

(10) Patent No.: US 7,339,296 B2
(45) Date of Patent: Mar. 4, 2008

(54) AC GENERATOR HAVING BUILT-IN VOLTAGE REGULATOR

(75) Inventors: Seiji Kondo, Kariya (JP); Hitoshi Wada, Fuwa-gun (JP); Motoki Ito, Obu (JP)

(73) Assignee: Denso Corproation, Kariya (JP)

( * ) Notice: Subject to any disclaimer, the term of this patent is extended or adjusted under 35 U.S.C. 154(b) by 174 days.

(21) Appl. No.: 10/868,853

(22) Filed: Jun. 17, 2004

(65) Prior Publication Data

US 2004/0256928 A1  Dec. 23, 2004

(30) Foreign Application Priority Data

Jun. 18, 2003 (JP) .............................. 2003-172818

(51) Int. Cl.
*H02K 11/00* (2006.01)

(52) U.S. Cl. ...................................... 310/68 D; 310/64

(58) Field of Classification Search .............. 310/68 D, 310/64, 239
See application file for complete search history.

(56) References Cited

U.S. PATENT DOCUMENTS

| | | | | |
|---|---|---|---|---|
| 4,926,076 A * | 5/1990 | Nimura et al. | ............ | 310/68 D |
| 5,625,229 A | 4/1997 | Kojima et al. | | |
| 6,060,802 A | 5/2000 | Masegi et al. | | |
| 6,169,344 B1 * | 1/2001 | Tsuruhara | .................... | 310/58 |
| 6,198,188 B1 | 3/2001 | Ihata | | |
| 6,351,046 B1 * | 2/2002 | Bradfield | ..................... | 310/63 |
| 6,525,438 B1 * | 2/2003 | Asao | ........................ | 310/68 D |
| 6,538,352 B2 * | 3/2003 | Asao | ........................ | 310/68 D |
| 6,580,187 B2 * | 6/2003 | Bradfield | .................. | 310/68 D |
| 6,664,674 B2 * | 12/2003 | Ihata | ........................... | 310/64 |
| 6,900,566 B2 * | 5/2005 | Misaki | ....................... | 310/89 |
| 2002/0079757 A1 * | 6/2002 | Bradfield | .................. | 310/68 D |
| 2004/0183385 A1 * | 9/2004 | Takahashi et al. | ....... | 310/68 D |

FOREIGN PATENT DOCUMENTS

| | | | |
|---|---|---|---|
| EP | 1146626 A1 | * | 10/2001 |
| JP | 61106047 A | * | 5/1986 |
| JP | 62163547 A | * | 7/1987 |
| JP | A-5-219704 | | 8/1993 |
| JP | A 8-85402 | | 4/1996 |
| JP | A-8-320194 | | 12/1996 |
| JP | A-2000-245112 | | 9/2000 |
| JP | A-2000-253625 | | 9/2000 |
| JP | 2001298907 A | * | 10/2001 |
| JP | 2002223553 A | * | 8/2002 |

* cited by examiner

*Primary Examiner*—Dang Le
*Assistant Examiner*—Nguyen Hanh
(74) *Attorney, Agent, or Firm*—Oliff & Berridge, PLC (57) ABSTRACT

An ac generator for a vehicle includes a rotor having a field coil, a stator having a stator winding disposed around the rotor to provide ac power in cooperation with the rotor, a brush unit disposed near a rotation axis of the rotor, and a voltage regulator for controlling output voltage of the ac power. The voltage regulator has a regulator circuit section and a heat sink for dissipating heat generated by the regulator circuit section. The heat sink has a plurality of axially projecting cooling fins that extends in a circumferential direction of the rotor.

6 Claims, 7 Drawing Sheets

AC GENERATOR HAVING BUILT-IN VOLTAGE REGULATOR

CROSS REFERENCE TO RELATED APPLICATION

The present application is based on and claims priority from Japanese Patent Application 2003-172818, filed Jun. 18, 2003, the contents of which are incorporated herein by reference.

BACKGROUND OF THE INVENTION

1. Field of the Invention

The present invention relates to an ac generator for a vehicle such as a passenger car or a truck.

2. Description of the Related Art

As disclosed in JP-A-85402, an ordinary voltage regulator that is mounted in an ac generator for a vehicle has a unitary molded body that includes a circuit board on which an IC chip or transistors are mounted, a heat sink that is fixed to the circuit board by a heat conductive cement and a male connector. In general, the heat sink has a plurality of cooling fins or ribs that extends in a radial direction, as disclosed in JP-A-85402 and JP-P2000-253625A or its counterpart U.S. Pat. No. 6,198,188. Therefore, cooling air is guided by the cooling fins to flow in a radial direction toward the center axis of the ac generator. Because a brush unit of an ordinary ac generator for a vehicle, which has a pair of brushes, is disposed between the voltage regulator and the center axis, the brushes are exposed to the cooling air that has cooled the voltage regulator, or has been heated by the voltage regulator. Therefore, the brushes may be heated by the heated cooling air. In addition, dust or foreign materials may collect around the brush unit. As a result, it is likely that the brushes wear away excessively.

SUMMARY OF THE INVENTION

Therefore, a main object of the present invention is to provide an improved ac generator for a vehicle in which the brushes are not excessively heated.

According to a main feature of the invention, a ac generator for a vehicle includes a rotor having a field coil, a stator having a stator winding and is disposed around the rotor, a brush unit disposed near a rotation axis of the rotor, a voltage regulator for controlling output voltage of the ac power. With the above structure, the voltage regulator has a regulator circuit section and a heat sink for dissipating heat generated by the regulator circuit section, and the heat sink has a plurality of axially projecting cooling fins that extends in a circumferential direction of the rotor. Therefore, cooling air that is taken in from air-intake windows of a protection cover flows along cooling passages formed among the cooling fins. As a result, the cooling air that has cooled the cooling fins of the voltage regulator is prevented from directly blowing on the brush unit, so that the temperature rise of brushes by the heated cooling air can be prevented. This structure can also prevent dust or foreign materials contained in the cooling air from reaching the brushes.

In the above structured ac generator the cooling fins may have undulations or arc-shapes extending in a circumferential direction of the rotor. Such cooling fins provide a wider heat dissipation area than straight cooling fins.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The present invention will be described with reference to the appended drawings.

Figure 1:
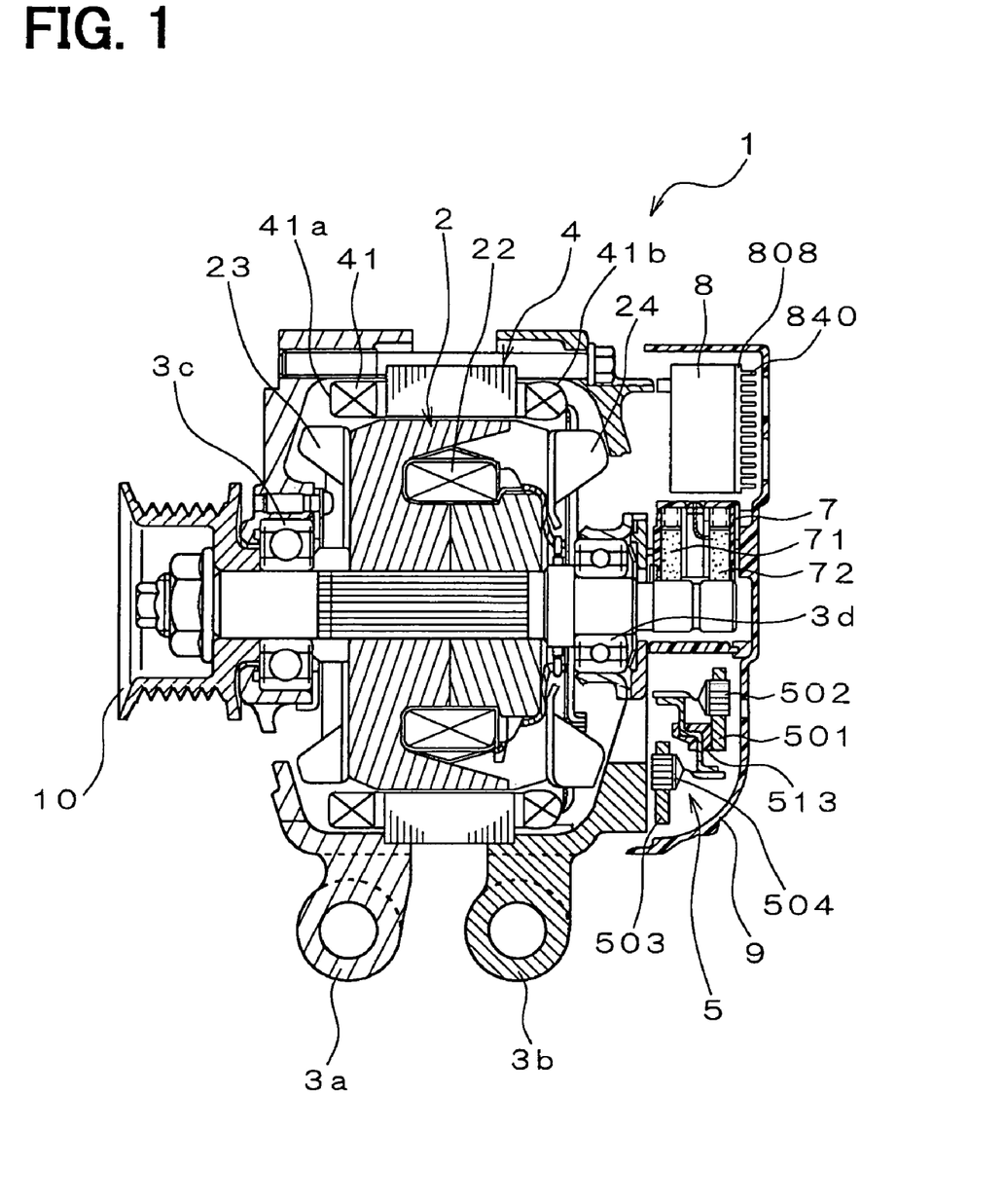
FIG. 1 is a longitudinal cross-sectional side view of an ac generator according to a preferred embodiment of the invention.

As shown in FIG. 1, an ac generator 1 for a vehicle includes a rotor 2 that includes a field coil 22, a pair of a front frame 3*a* and a rear frame 3*b* which supports the rotor 2 via a pair of front bearing 3*c* and rear bearing 3*d*, a stator 4 that has a stator winding and functions as an armature, a rectifying unit 5 that converts ac power to dc power, a brush unit 7 that supplies field current to the field coil 22, a voltage regulator 8, a resinous protection cover 9 that is fixed to the rear frame to cover rectifying unit 5, the brush unit 7 and the voltage regulator 8, etc.

A centrifugal-and-axial-mixed flow type cooling fan 23 is provided at the front end of the rotor 2, and a centrifugal flow type cooling fan 24 is also provided at the rear end of the rotor 2. When the rotor 2 rotates, cooling air is taken in from air-intake windows that are formed at an axial end surface of the front frame 3*a* to cool the front coil end 41*a* of a stator winding 41 of the stator 4 and the field coil 22. At the same time, cooling air is separately taken in from air-intake windows that are formed at the protection cover 9 to cool the rectifying unit 5, the brush unit 7 and the voltage regulator 8. Thereafter, this cooling air is introduced to the centrifugal cooling fan 24 and is driven radially outward to cool the stator winding 41.

Figure 2:
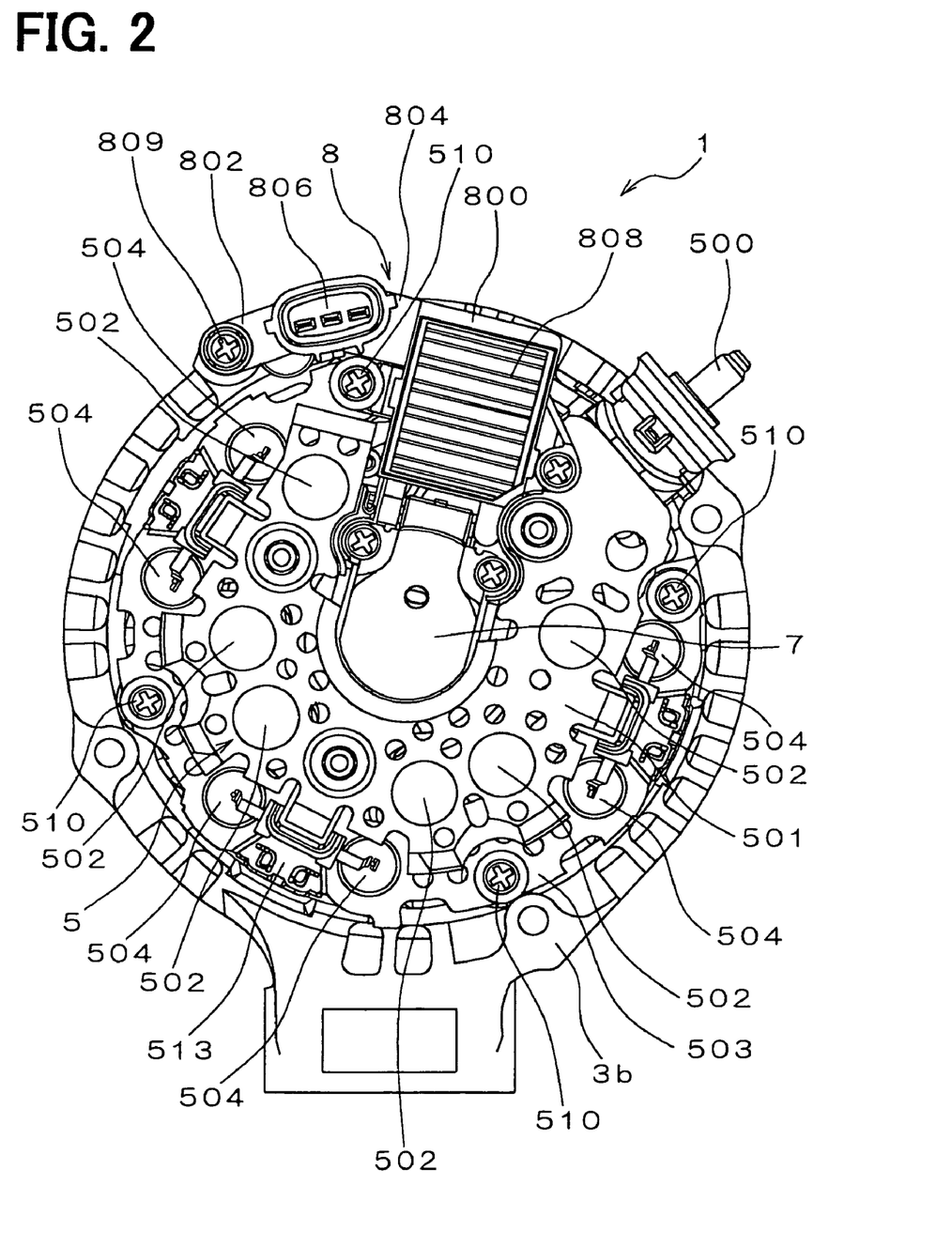
FIG. 2 is a plan view of a portion of the ac generator where a rectifying unit, a brush unit and a voltage regulator are disposed.

The rectifying unit 5 includes a pair of axially piled horseshoe type positive and negative cooling fins 501, 503 and a terminal unit 513. The positive cooling fin 501 has a plurality (e.g. six) of positive type diodes 502, and the negative cooling fin 503 has a plurality (e.g. six) of negative type diodes 504. The terminal unit 513 includes an insulation member to insulate the positive cooling fin 501 and the negative cooling fin 503 from each other and conductive members to connect output ends of the stator 4 to the positive type and negative type diodes 502, 504 so as to convert ac power of the stator 4 to dc power. Each positive type diode 502 has one end fitted to a hole formed in the positive cooling fin 501 and the other end having a lead terminal extending toward the negative cooling fin 503, and each negative type diode 504 has one end fitted to a hole formed in the negative cooling fin 503 and the other end having a lead terminal extending toward the positive cooling fin 501. The lead terminals are respectively connected to the conductive members of the terminal member 513 so that the diodes 502, 504 can form a pair of full-wave rectifying bridge circuits. An output terminal bolt 500 is fixed to the positive cooling fin 501 to output dc power from the terminal bolt 500.

The rectifying unit 5 is disposed between the rear frame 3b and the protection cover 9 and is fixed, together with the protection cover 9, to a support member for supporting a bearing box that accommodates the rear bearing 3d. The negative fin 503 has a larger outside diameter than the positive cooling fin 501 and is located comparatively radially outside the positive cooling fin 501. The negative fin 503 has plural (e.g. four) mounting portions formed along the periphery thereof at equal intervals. The negative fin 503 is fixed at the mounting portions to the rear frame 3b by screws 510, so that heat of the negative fin 503 can be transmitted to the rear frame 3b.

The rectifying unit 5 has an accommodation space at a peripheral portion of the unit 5 to accommodate the brush unit 7 that is located near the rotation axis of the rotor 2 and a portion of the voltage regulator 8 that is located at radially outer side of the brush unit 7.

Figure 3:
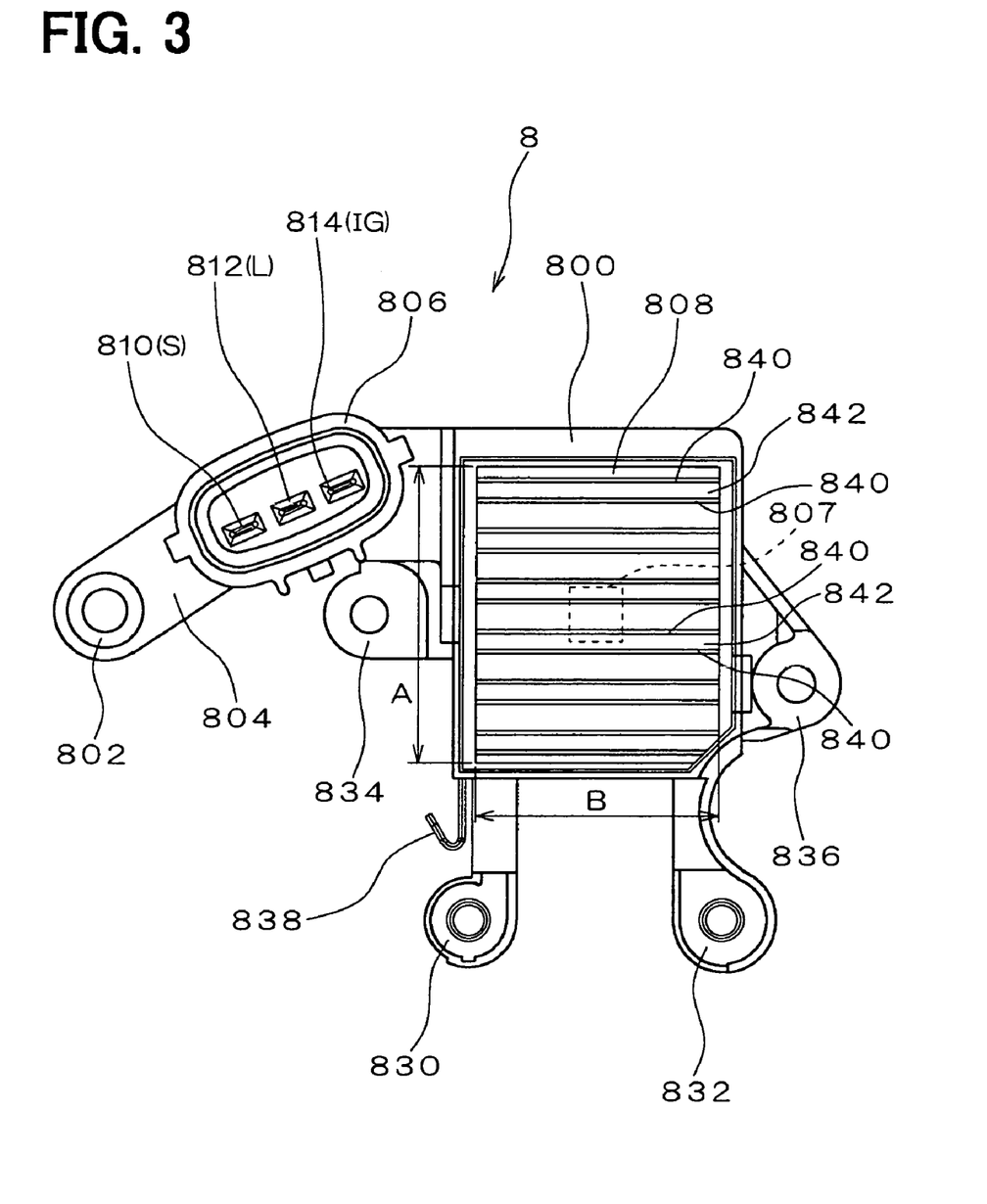
FIG. 3 is an enlarged plan view of the voltage regulator shown in FIG. 2.
Figure 4:
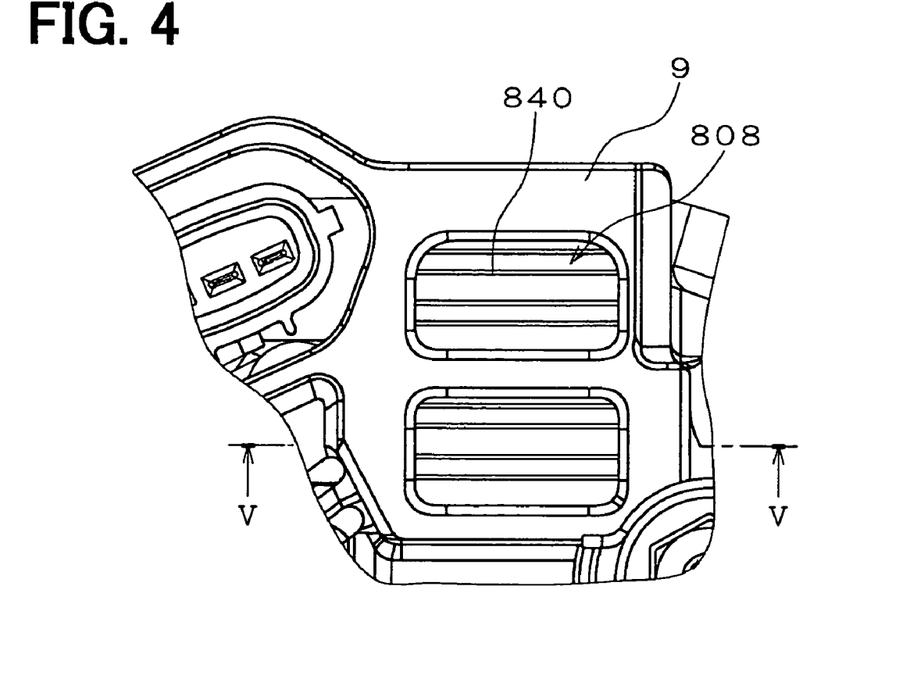
FIG. 4 is an enlarged fragmentary view of the voltage regulator being assembled into the ac generator.

The voltage regulator 8 includes a regulator section 800 that is located at the accommodation space, a generally arc-shaped arm 804 that extends in a circumferential direction of the rear frame 3b and a connector 806. The arm 804 has a mounting portion 802 at an end, which slightly projects radially outward from the rear frame 3b. The connector 806 has three connector terminals 810, 812, 814 and extends in parallel to the rotating axis of the rotor 2, so that the connector 806 does not project radially outward from the rear frame 3b. The connector 806 and the mounting portion 802 are respectively located at the peripheral portions that have the same distance from rotating axis of the rotor 2. Therefore, the phase of vibration of the mounting portion 802 and the phase of the vibration of the connector 806, which are caused by rotation of the rotor 2, can be made equal so that the magnitude of the vibration of the connector 806 can be reduced. The mounting portion 802 is fixed to a surface 3e of the rear frame 3b by a bolt 809. Because the arm 804 is directly fixed to the rear frame at the mounting portion 802, vibration of the connector can be prevented.

Figure 6:
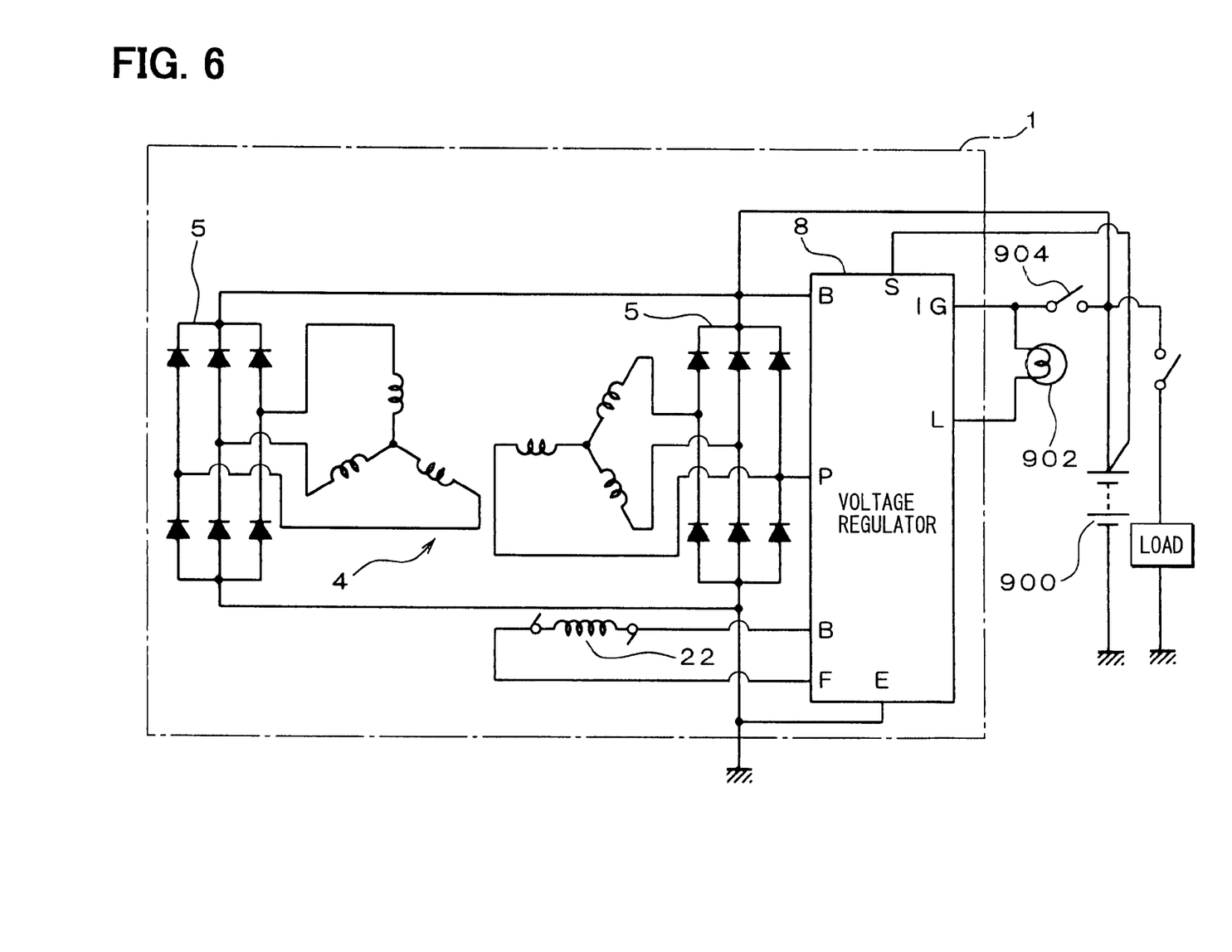
FIG. 6 is a circuit diagram of the ac generator.

The voltage regulator 8 has a pair of terminals 830, 832 connected to the brush unit 7 and three terminals 834, 836, 838 connected to the rectifying unit 5. In more detail, the pair of terminals 830, 832 are, respectively, so-called F-terminal and B terminal that are connected across the field coil 22. The terminal 834 is so called E-terminal that is connected to the negative cooling fin 503, the terminal 836 is so-called B-terminal that is connected to the positive cooling fin 501 and internally connected to the terminal 832, and the terminal 838 is so-called P-terminal that is connected to one of three phase windings of the stator 4. The connector terminals 810, 812, 814 are, respectively, so-called S-terminal that is connected to the positive side terminal of a battery 900, L-terminal that is connected to an alarm lamp 902 and IG-terminal that is connected to an ignition switch 904. They are connected by cables extended in parallel to the rotation axis of the rotor 2.

The heat sink 808 has a generally rectangular surface from which a plurality of cooling fins 840 that projects in the axial direction of the rotor 2 to extend in a circumferential direction of the rotor 2. In other words, each cooling fin 840 is a flat plate that extends in a direction perpendicular to a radial direction of the rotor 2, so that a plurality of cooling air passages 842 is formed among the cooling fins 840. The rectangular surface of the heat sink 808 has a radial length A and a circumferential length B that is shorter than the radial length A. This provides a sufficient space S for introducing the cooling air, as shown in FIG. 5.

Figure 5:
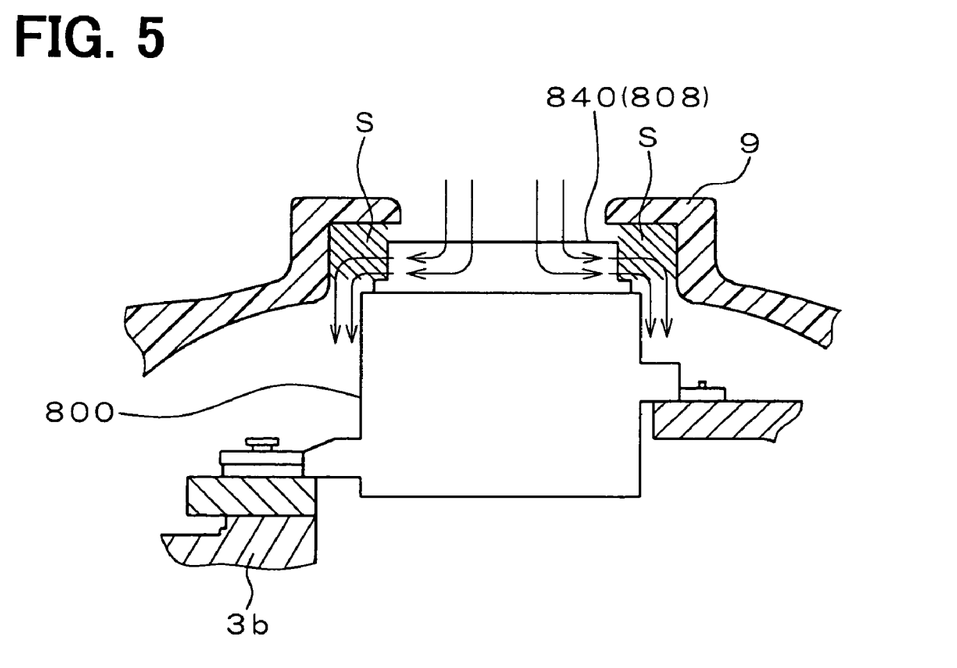
FIG. 5 is a cross-sectional view of the voltage regulator cut along line V-V in FIG. 4.

As shown in FIG. 5, the cooling air that is taken in from the air-intake windows of the protection cover 9 flows along the cooling passages 842 formed among the cooling fins 840 and along the circumferentially opposite surfaces of the regulator section 800 toward the rear frame 3b. Therefore, the cooling air that has cooled the cooling fins 840 of the voltage regulator 8 is prevented from directly blowing on the brush unit 7, so that the temperature rise of the brushes by the heated cooling air can be prevented. This structure can also prevent dust or foreign materials contained in the cooling air from reaching the brushes.

Figure 7:
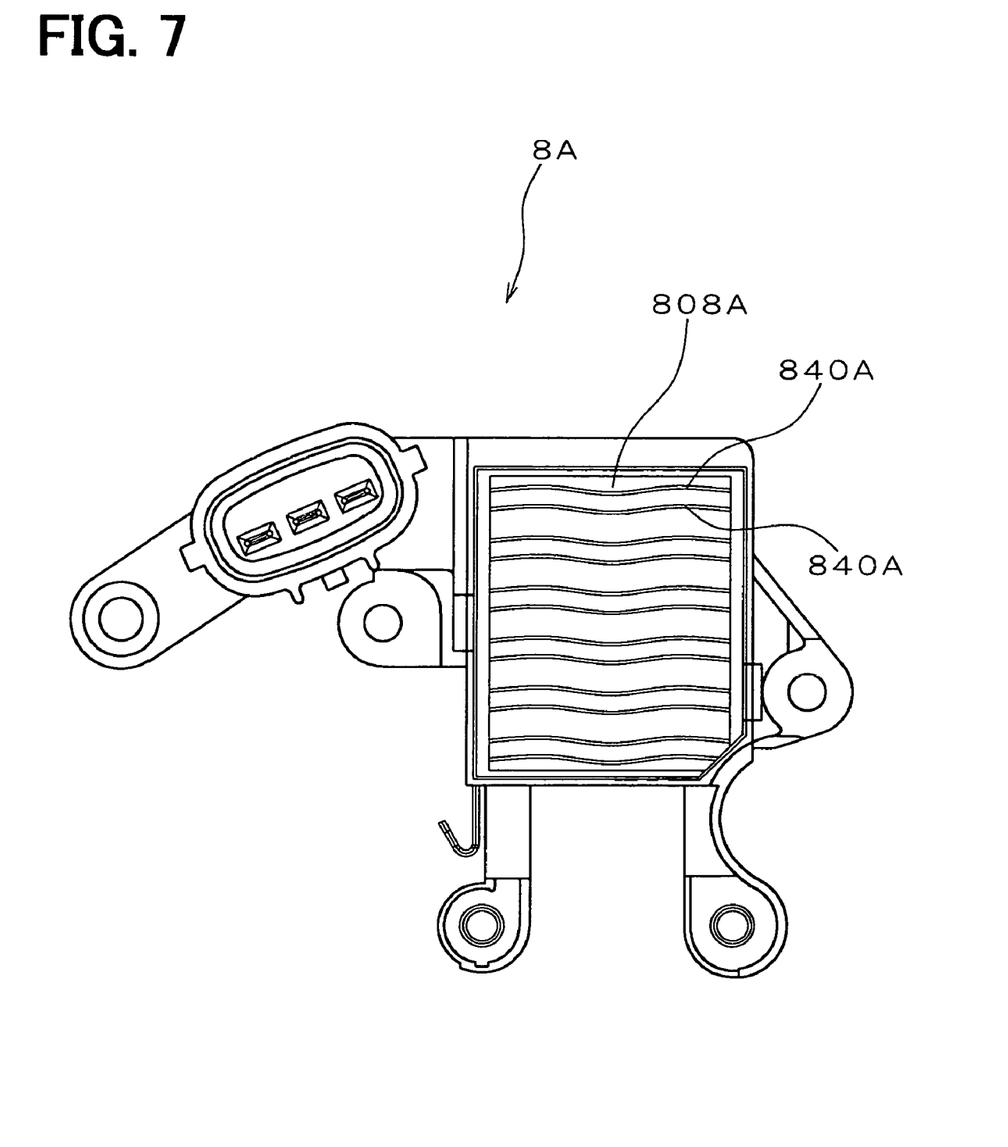
FIG. 7 is a variation of the voltage regulator.
Figure 8:
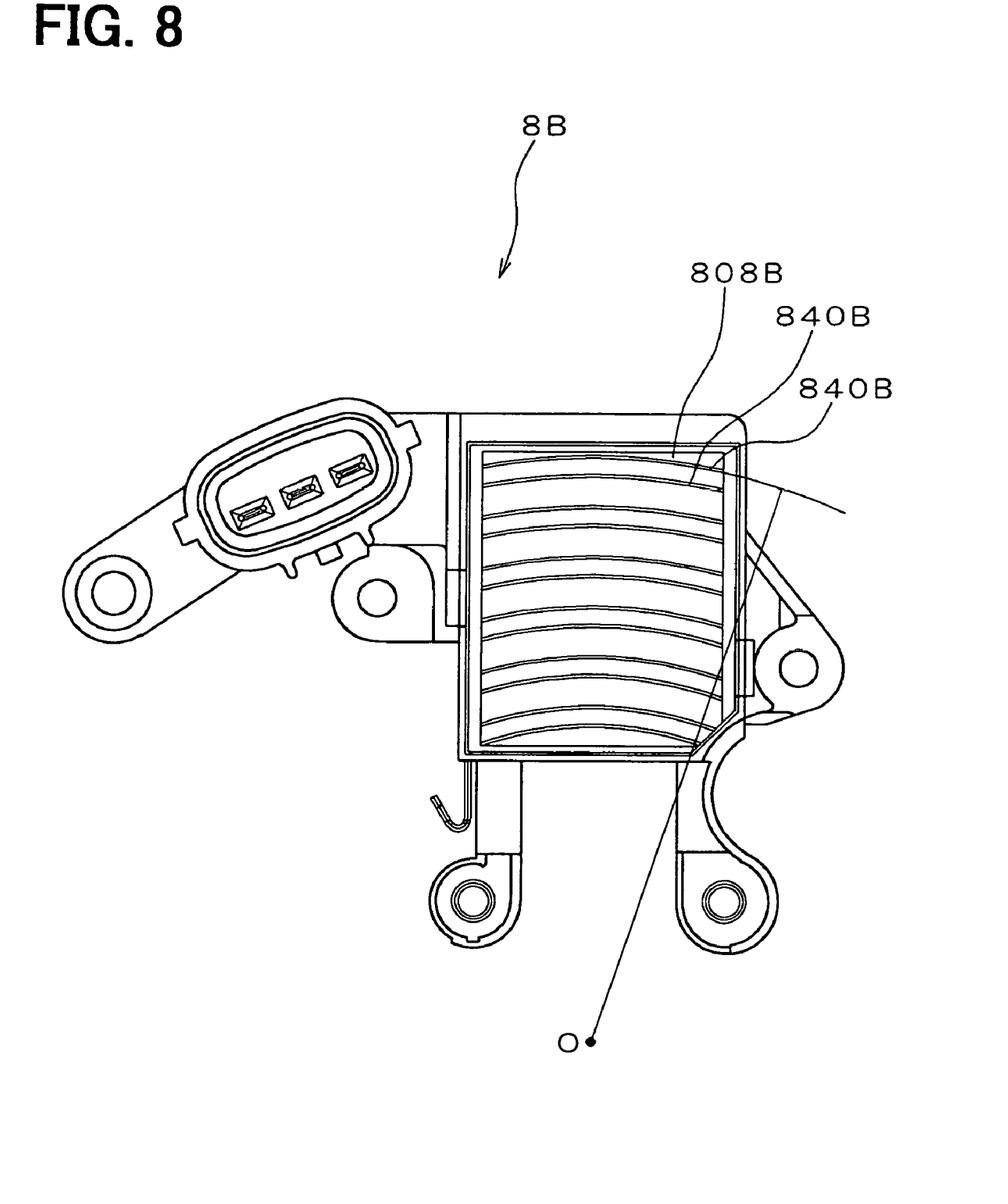
FIG. 8 is another variation of the voltage regulator.

The ac generator 1 may have a modified voltage regulator 8A or 8B. As shown in FIG. 7, the modified voltage regulator 8A has a heat sink 808A the cooling fins 840A of which have undulations or waves extending in a circumferential direction of the rotor. As shown in FIG. 8, the modified voltage regulator 8B has a heat sink 808B that has a plurality of arc-shaped cooling fins 840B extending a circumferential direction of the rotor 2. Preferably, each of the arc-shaped cooling fins 840B has the same center of the circle as the rotor 2 so as to guide the heated cooling air in coaxial circles.

Both heat sinks 808A and 808B provide a wider heat dissipation area than the heat sink 808.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An ac generator for a vehicle comprising:
   a rotor having a field coil;
   a stator having a stator winding disposed around said rotor to provide ac power in cooperation with said rotor;
   a rectifying unit having a pair of diode cooling fins that has an accommodation space at a peripheral portion thereof;
   a brush unit having brushes for supplying field current to the field coil, said brush unit being disposed in said accommodation space near a rotation axis of said rotor,
   a voltage regulator for controlling output voltage of the ac power, said voltage regulator having a regulator circuit section and a heat sink that is disposed in said accommodation space radially outside of said brush unit at a space from the same;
   a housing for covering said rotor, stator, rectifying unit, brush unit and voltage regulator, said housing having an air intake window over said heat sink;
   a centrifugal cooling fan fixed to a side of said rotor near said rectifying unit to take in cooling air from said air intake window into an inside portion of said cooling fan; and
   wherein said heat sink has a plurality of axially projecting cooling fins that extends in a circumferential direction of said rotor so as to form a plurality of cooling air passages guiding the cooling air to flow along the circumferentially opposite surfaces of said voltage regulator to the accommodation space, thereby detouring the brush unit, wherein said heat sink has a generally rectangular surface from which said cooling fins project in the axial direction of said rotor, and wherein the rectangular surface of said heat sink has a radial length and a circumferential length that is shorter than the radial length to provide a maximum space for introducing the cooling air in the accommodation space.

2. The ac generator as claimed in claim 1, further comprising a pair of front and rear frames for supporting said rotor and stator and a protection cover, wherein said voltage regulator is disposed between said rear cover and said protection cover.

3. An ac generator for a vehicle comprising:
a rotor having a field coil and a cooling fan for providing cooling air;
a stator having a stator winding disposed around said rotor to provide ac power in cooperation with said rotor,
a frame for supporting said rotor and said stator;
a protection cover having air intake windows, said cover being fixed to an end of said frame;
a rectifying unit having a pair of diode cooling fins, disposed between said frame and said protection cover, said rectifying unit having a circumferentially open accommodation space at a peripheral portion thereof;
a brush unit having brushes for supplying field current to the field coil, said brush unit being disposed in said accommodation space near a rotation axis of said rotor;
a voltage regulator, disposed between said frame and said protection cover, for controlling output voltage of the ac power, said voltage regulator having a regulator circuit section and a heat sink that is disposed in said accommodation space radially outside of said brush unit at a space from the same under said air intake window;

wherein said cooling fan is a centrifugal fan disposed near said accommodation space to take in cooling air from said intake window into an inside portion of said cooling fan; and wherein said heat sink has a plurality of axially projecting cooling fins to extend in a circumferential direction of said rotor so as to form a plurality of cooling air passages guiding the cooling air to the accommodation space, thereby detouring said brush unit.

4. The ac generator as claimed in claim 3,
wherein said heat sink has a generally rectangular surface from which said cooling fins project in the axial direction of said rotor.

5. The ac generator as claimed in claim 4,
wherein the rectangular surface of said heat sink has a radial length arid a circumferential length that is shorter than the radial length to provide a maximum space for introducing the cooling air in the accommodation space.

6. The ac generator as claimed in claim 3, wherein said cooling fins are disposed opposite one of said air intake windows so that cooling air can be taken in from one of the air-intake windows along said cooling fins.

* * * * *